United States Patent
Cerriteno et al.

(10) Patent No.: US 10,146,303 B2
(45) Date of Patent: Dec. 4, 2018

(54) GAZE-ACTUATED USER INTERFACE WITH VISUAL FEEDBACK

(71) Applicant: Microsoft Technology Licensing, LLC, Redmond, WA (US)

(72) Inventors: Alberto Cerriteno, Bothell, WA (US); Aaron Chandler Jeromin, Redmond, WA (US); Megan Saunders, Kirkland, WA (US); Dan Osborn, Woodinville, WA (US); Adam Christopher Heaney, Bellevue, WA (US); Forest Woodcroft Gouin, Seattle, WA (US); James Nakashima, Kirkland, WA (US); Patrick Ryan, Bainbridge Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 124 days.

(21) Appl. No.: 14/717,878

(22) Filed: May 20, 2015

(65) Prior Publication Data

US 2016/0209917 A1    Jul. 21, 2016

Related U.S. Application Data

(60) Provisional application No. 62/105,681, filed on Jan. 20, 2015.

(51) Int. Cl.
*G06F 3/01* (2006.01)
*G06F 3/03* (2006.01)
*G06F 3/0484* (2013.01)

(52) U.S. Cl.
CPC ........... *G06F 3/013* (2013.01); *G06F 3/0304* (2013.01); *G06F 3/04842* (2013.01)

(58) Field of Classification Search
CPC .............................. G06F 3/0304; G06F 3/013
(Continued)

(56) References Cited

U.S. PATENT DOCUMENTS

| 5,608,850 A | 3/1997 | Robertson |
|---|---|---|
| 6,243,076 B1 | 6/2001 | Hatfield |

(Continued)

FOREIGN PATENT DOCUMENTS

| EP | 2525271 A2 | 11/2012 |
|---|---|---|
| WO | 1986003863 A1 | 7/1986 |

OTHER PUBLICATIONS

ISA European Patent Office, International Search Report and Written Opinion Issued in Application No. PCT/US2016/013311, dated Apr. 20, 2016, WIPO, 13 Pages.

(Continued)

*Primary Examiner* — Carolyn R Edwards
(74) *Attorney, Agent, or Firm* — Alleman Hall Creasman & Tuttle LLP

(57) ABSTRACT

A method to provide visual feedback for gazed-based user-interface navigation includes presenting, on a display, a first image representing a digital object available for user interaction, recognizing a user gaze axis, and computing a point of intersection of the user gaze axis through the first image. An offset distance between the point of intersection and a reference position of the first image then recognized, and a second image is presented on the display. The second image is presented displaced from the point of intersection by an amount dependent on the offset distance.

20 Claims, 9 Drawing Sheets

(58) Field of Classification Search
USPC .................................... 345/5–9, 156–184
See application file for complete search history.

(56) References Cited

U.S. PATENT DOCUMENTS

| | | | |
|---|---|---|---|
| 8,120,577 B2 | 2/2012 | Bouvin et al. | |
| 8,350,726 B2 | 1/2013 | Mathan et al. | |
| 8,405,610 B1* | 3/2013 | Cole | G06F 3/013 345/158 |
| 8,793,620 B2 | 7/2014 | Stafford | |
| 2009/0315827 A1* | 12/2009 | Elvesjo | G06F 3/013 345/157 |
| 2010/0287500 A1* | 11/2010 | Whitlow | G02B 27/01 715/810 |
| 2012/0036433 A1 | 2/2012 | Zimmer et al. | |
| 2012/0293406 A1* | 11/2012 | Park | G06F 1/1626 345/156 |
| 2013/0016102 A1 | 1/2013 | Look et al. | |
| 2013/0050258 A1 | 2/2013 | Liu et al. | |
| 2013/0154913 A1 | 6/2013 | Genc et al. | |
| 2013/0169532 A1 | 7/2013 | Jahnke | |
| 2014/0085198 A1 | 3/2014 | Jahnke et al. | |
| 2014/0160001 A1* | 6/2014 | Kinnebrew | G06F 3/012 345/156 |
| 2014/0168056 A1 | 6/2014 | Swaminathan et al. | |
| 2014/0232638 A1* | 8/2014 | Choi | G06F 3/013 345/156 |
| 2014/0354533 A1* | 12/2014 | Swaminathan | G06F 3/013 345/156 |
| 2015/0378159 A1* | 12/2015 | Lundberg | G06F 3/012 345/8 |

OTHER PUBLICATIONS

Park, et al., "3D Social Saliency from Head-mounted Cameras", In Advances in Neural Information Processing Systems, Dec. 3, 2012, 9 pages.

IPEA European Patent Office, International Preliminary Report on Patentability Issued in PCT Application No. PCT/US2016/013311, dated Apr. 12, 2017, WIPO, 6 Pages.

IPEA European Patent Office, Second Written Opinion Issued in PCT Application No. PCT/US2016/013311, dated Sep. 12, 2016, WIPO, 5 pages.

* cited by examiner

GAZE-ACTUATED USER INTERFACE WITH VISUAL FEEDBACK

CROSS REFERENCE TO RELATED APPLICATIONS

This application claims priority to U.S. Provisional Patent Application 62/105,681, filed Jan. 20, 2015 and entitled "GAZE-ACTUATED USER INTERFACE WITH VISUAL FEEDBACK", the entirety of which is hereby incorporated by reference herein.

BACKGROUND

A traditional graphical user interface of a computer system is navigated with the aid of a manual pointing device, such as a mouse. A conspicuous mouse pointer may be displayed on the interface, so as to indicate to the user the position currently being pointed to. However, the use of a mouse and mouse pointer is antagonistic to certain natural user input (NUI) modalities emerging today. In vision-based NUI, the user may invoke a pointing action—object targeting, selection, or activation, for example—merely by pointing a finger in the direction of an intended display object. With gaze-tracking input, the user's localized, ocular gaze may be used to direct the pointing action.

SUMMARY

One embodiment of this disclosure offers a method to provide visual feedback for gazed-based user-interface navigation. The method includes presenting, on a display, a first image representing a digital object available for user interaction, recognizing a user gaze axis, and computing a point of intersection of the user gaze axis through the first image. An offset distance between the point of intersection and a reference position of the first image is then recognized, and a second image is presented on the display. The second image is presented displaced from the point of intersection by an amount dependent on the offset distance.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Neither is the claimed subject matter limited to implementations that solve the prior disadvantages noted in this disclosure.

DETAILED DESCRIPTION

Figure 1:
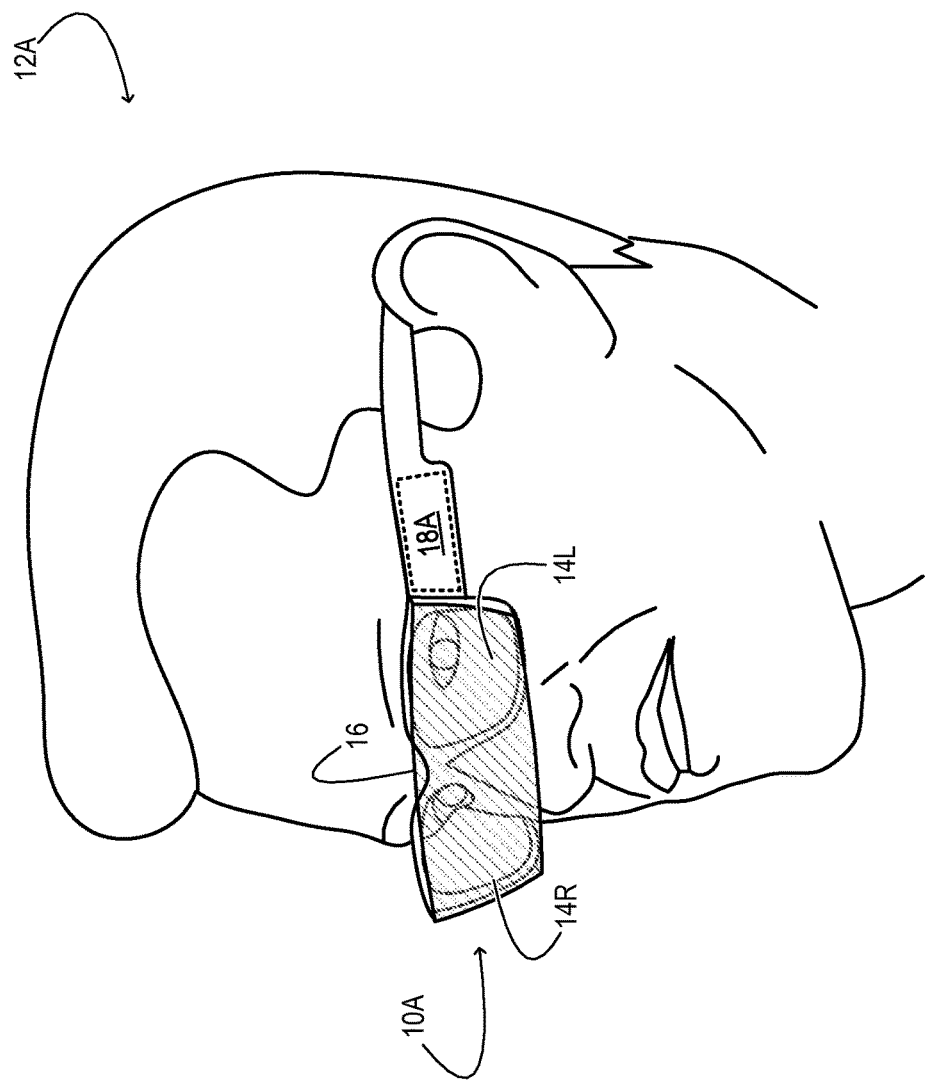
FIG. 1 shows aspects of an example wearable display system.

Components, process steps, and other elements that may be substantially the same in one or more implementations are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example head-mounted display system 10A to be worn and used by a wearer 12A, also described as 'the user'. The illustrated display system includes stereoscopic, see-through display componentry positioned close to the wearer's eyes. Thus, display system 10A may be used in augmented-reality applications, where real-world imagery is admixed with virtual display imagery.

Display system 10A of FIG. 1 includes separate right and left display panels, 14R and 14L, and an electronically modulated dimming screen 16. In some embodiments, the right and left display panels are wholly or partly transparent from the perspective of the wearer, to give the wearer a clear view of his or her surroundings. Controller 18A is operatively coupled to the display panels, to the dimming screen, and to other display-system componentry. The controller includes logic and associated computer memory configured to provide image signal to the display panels and to enact the other control processes described herein.

Figure 2:
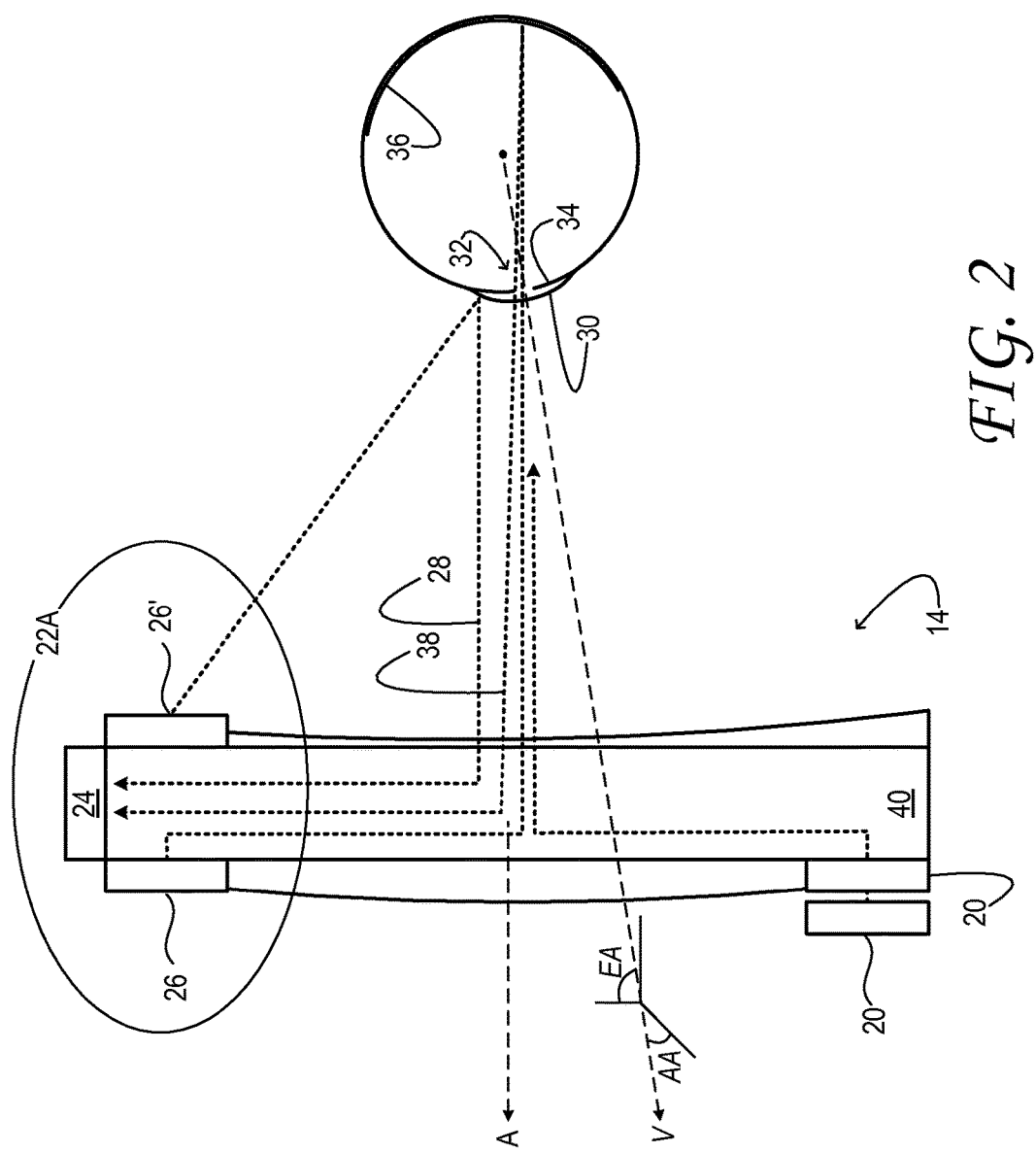
FIG. 2 shows aspects of an example display panel of a head-mounted display system.

FIG. 2 shows aspects of right or left display panel 14 (14R, 14L) in one, non-limiting embodiment. The display panel includes a backlight 20 and a liquid-crystal display (LCD) matrix 20. The backlight may include an ensemble of light-emitting diodes (LEDs)—e.g., white LEDs or a distribution of red, green, and blue LEDs. The backlight may be configured to direct its emission through the LCD matrix, which forms a display image based on control signals from controller 18A. The LCD matrix may include numerous, individually addressable pixels arranged on a rectangular grid or other geometry. In some embodiments, pixels transmitting red light may be juxtaposed to pixels transmitting green and blue light, so that the LCD matrix forms a color image. In other embodiments, a reflective liquid-crystal-on-silicon (LCOS) matrix or a digital micromirror array may be used in lieu of the LCD matrix of FIG. 2. Alternatively, an active LED matrix or suitable scanned-beam technology may be used to form right and left display images. Although the drawings show separate right and left display panels, a single display panel extending over both eyes may be used instead.

Display panel 14 includes a sensory subsystem 22A, also operatively coupled to controller 18A. In the illustrated embodiment, the sensory subsystem includes an eye-imaging camera 24, an on-axis illumination source 26 and an off-axis illumination source 26'. Each illumination source emits infrared (IR) or near-infrared (NIR) illumination in a high-sensitivity wavelength band of the eye-imaging camera. Each illumination source may comprise a light-emitting diode (LED), diode laser, discharge illumination source, etc. The terms 'on-axis' and 'off-axis' refer to the direction of illumination with respect to the optical axis A of the eye-imaging camera.

Through any suitable objective-lens system, eye-imaging camera 24 detects light over a range of field angles, mapping such angles to corresponding pixels of a sensory pixel array. In one embodiment, the eye-imaging camera may detect light in a plurality of wavelength channels—e.g., red, green, blue, etc.—associated with a subset of the pixels of the array. Alternatively, a monochromatic eye-imaging camera may be used, which images visible, near-infrared (NIR), infrared (IR), and/or ultraviolet (UV) light in grayscale. Color or brightness values for all of the pixels exposed in the eye-imaging camera constitute collectively a digital image. Controller 18A may be configured to use the output from the eye-imaging camera to track the gaze axis V of wearer 12A.

On- and off-axis illumination serve different purposes with respect to gaze tracking. As shown in FIG. 2, off-axis illumination can create a specular glint 28 that reflects from the cornea 30 of the wearer's eye. Off-axis illumination may also be used to illuminate the eye for a 'dark pupil' effect, where pupil 32 appears darker than the surrounding iris 34. By contrast, on-axis illumination from an IR or NIR source may be used to create a 'bright pupil' effect, where the pupil appears brighter than the surrounding iris. More specifically, IR or NIR illumination from on-axis illumination source 26 illuminates the retroreflective tissue of the retina 36 of the eye, which reflects the light back through the pupil, forming a bright image 38 of the pupil. Beam-turning optics 40 of display panel 14 enable the eye-imaging camera and the on-axis illumination source to share a common optical axis A, despite their arrangement on the periphery of the display panel. In some embodiments, the eye-imaging camera may include a wavelength filter blocking transmission outside of the emission band of the illumination sources, to improve bright-pupil contrast in the presence of strong ambient light.

Digital image data from eye-imaging camera 24 may be conveyed to associated logic in controller 18A or in a remote computer system accessible to the controller via a network. There, the image data may be processed to resolve such features as the pupil center, pupil outline, and/or one or more specular glints 28 from the cornea. The locations of such features in the image data may be used as input parameters in a model—e.g., a polynomial model—that relates feature position to the gaze axis V. In embodiments where a gaze axis is determined for the right and left eyes, the controller may also be configured to compute the wearer's focal point as the intersection of the right and left gaze axes. In some embodiments, an eye-imaging camera may be used to enact an iris- or retinal-scan function to determine the identity of wearer 12A.

Figure 3:
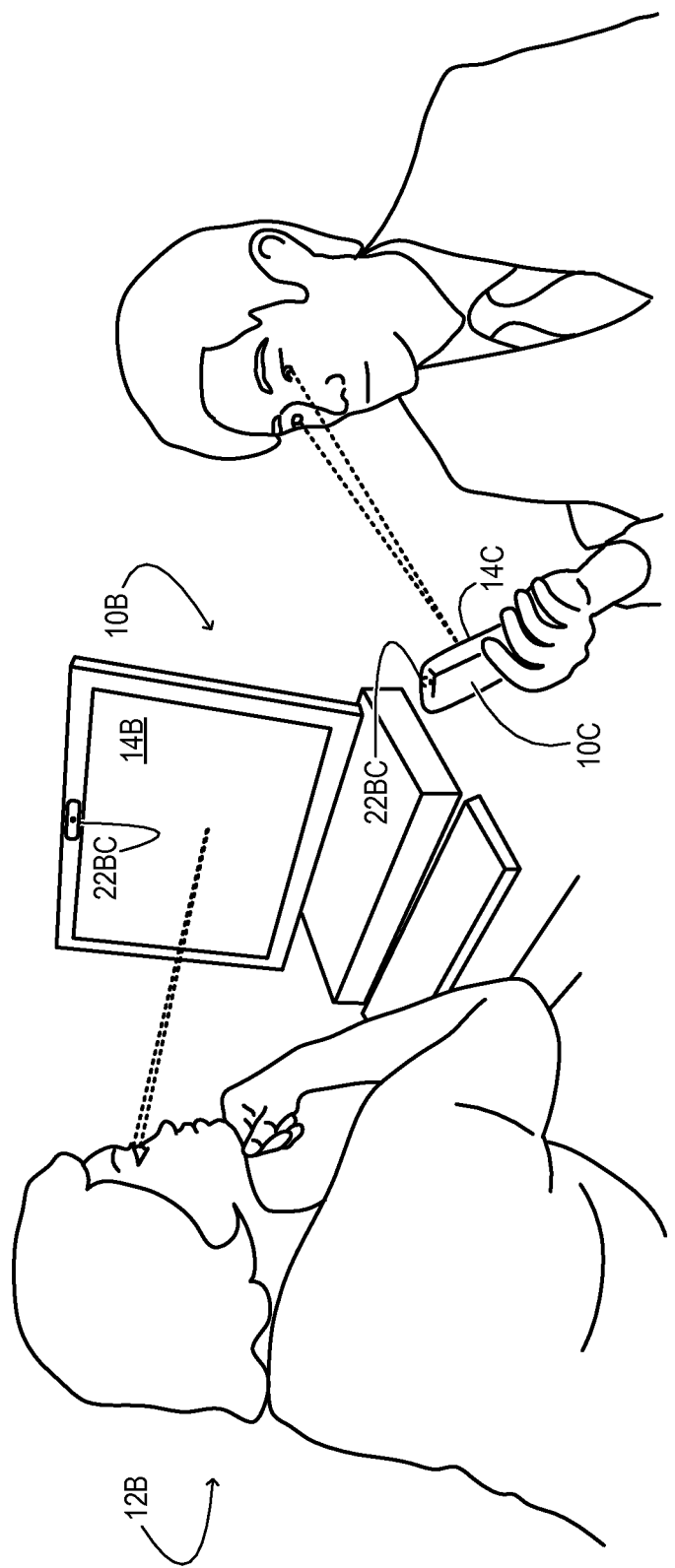
FIGS. 3 and 4 shows aspects of example non-wearable display systems.

The foregoing drawings and description identify one example display system 10A. Other, quite different, display systems also lie within the spirit and scope of this disclosure. FIG. 3 shows display systems 10B and 10C, which are neither head-mounted nor wearable. Display system 10B is a desktop computer system. In lieu of near-eye display panels 14R and 14L, display system 10B includes a computer monitor 14B arranged in sight of viewer 12B, also described as 'the user'. Display system 10C is a smart phone or tablet having a touch-screen display 14C. In the embodiments of FIG. 3, a sensory subsystem 22BC including an eye-imaging camera is arranged beneath the bezel of each display. The displays shown in FIG. 3 are not necessarily stereoscopic.

Figure 4:
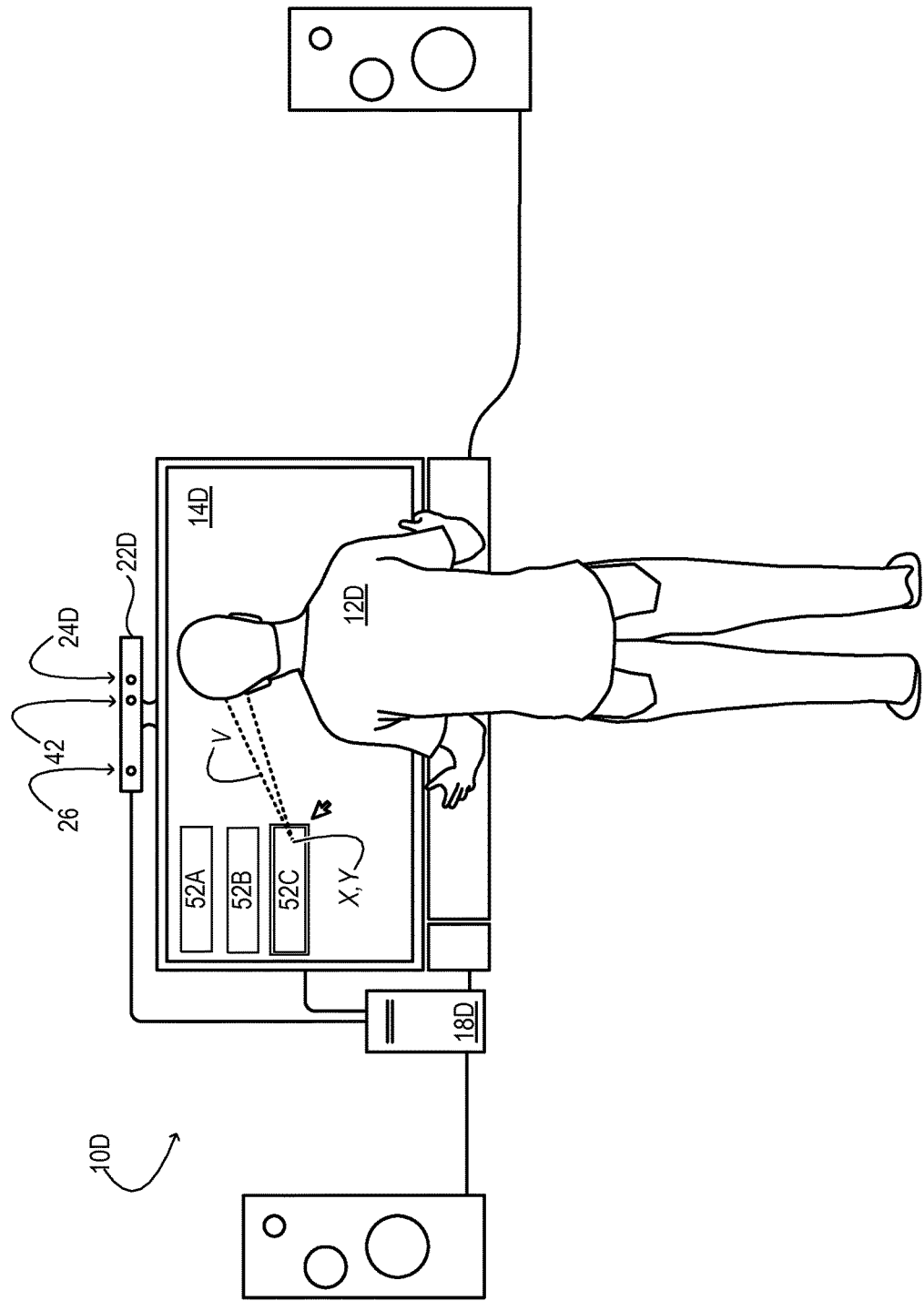

FIG. 4 shows yet another embodiment of a display system, in the form of home-entertainment system 10D. This display system may also function as a game system, multimedia system, or productivity system. It includes a large-format display 14D and a sensory subsystem 22D peripheral to the display. In this embodiment, controller 18D may take the form of a personal computer (PC) or game system operatively coupled to the display and to the sensory subsystem. In the embodiment of FIG. 4, the sensory subsystem takes the form of a vision system with a flat-image camera 24D and a depth camera 42 for gesture detection. An IR or NIR illumination source 26D provides illumination of viewer 12D for eye tracking and/or depth imaging. In some embodiments, sensory subsystem 22D may include dedicated on- and off-axis illumination sources, as described hereinabove.

Controller 18D—and indeed any of the controllers described herein—may include various functional processing engines instantiated in software and/or firmware. This aspect is further illustrated in FIG. 5. A gesture-recognition engine 44 in controller 18D may be configured to process the depth data from depth camera 42, to identify one or more human subjects in the depth data, to compute various skeletal features of the subjects identified, and to gather from the skeletal features various postural or gestural information, which is furnished to OS 46 or to application 48 executing on the controller.

In the scenario illustrated in FIG. 4, for example, viewer 12D is navigating a user interface (UI) presented on display 14D based on gaze axis or hand gesture. In one example, a gaze-tracking engine 50 in controller 18D computes display screen coordinates (X, Y) corresponding to the point that the user is gazing at, based on image data from flat-image camera 24D. By shifting his gaze to other points on the display screen, the viewer can navigate among the various UI elements 52 presented on the display—buttons, sliders, and tabs, for example. Alternatively, or in addition, gesture-recognition engine 44 may be configured to compute UI coordinates based on the position of the viewer's hand relative to a coordinate system fixed to the viewer's body.

Although several, distinct display-system embodiments are described herein, this disclosure also embraces any appropriate subcombination of features from the various embodiments. Virtual imagery from a head-mounted display system, for instance, may include UI elements navigable via ocular gaze. A tablet or smartphone may include a sensory subsystem equipped for depth imaging and gesture detection. A home-entertainment system may include a large-format stereoscopic display viewable through passive polarizer optics (so-called '3D glasses'). Numerous other subcombinations are envisaged as well.

The configurations herein enable user 12 of a display system 10 to explore, select, and/or activate a digital object represented on the display system using ocular gaze. Further refinement provides feedback to the user when exploring, selecting, and/or activating such objects. As described hereinafter, the feedback may include a visual effect rendered in 3D space. In this manner, the user is made aware of his or her interactions with the user interface through gaze, and is given an accurate sense of the impact point of the gaze against real and virtual objects in the field of view.

Figure 6:
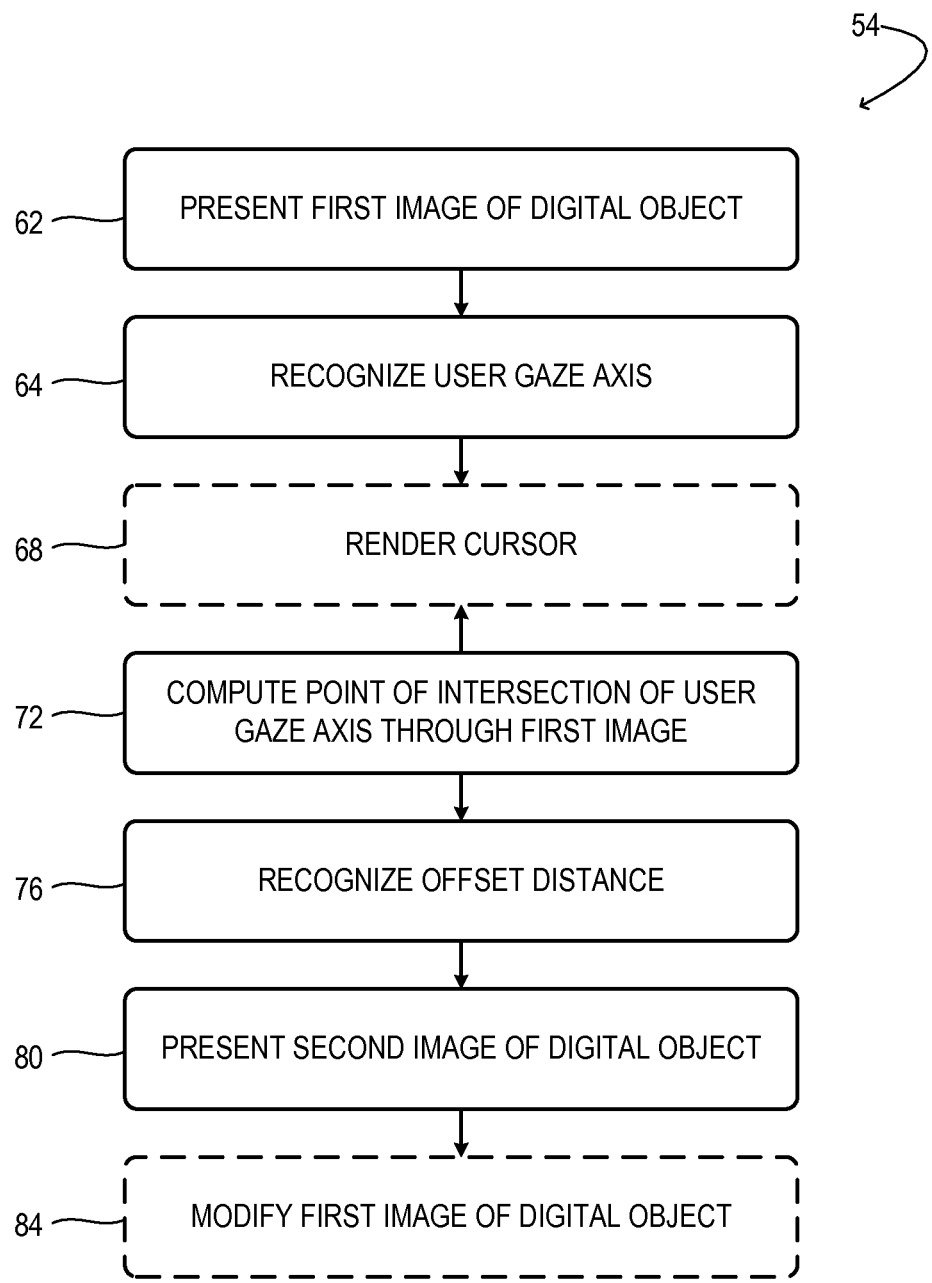
FIG. 6 illustrates an example method to provide visual feedback for gaze-based user-interface navigation.

FIG. 6 illustrates an example method 54 to provide visual feedback for gaze-based user-interface navigation. In describing this method, collateral reference is made first to FIG. 7 and then to FIG. 8. These drawings show aspects of an example user interface 56 arranged in sight of the right and left eyes 58R, 58L of user 12.

At 62 of method 54, a first image 60 representing a digital object 62 is presented on a display. The first image may be the only image representing digital object 62, or merely a forward or user-facing image, from among a plurality of images representing the same digital object. In some embodiments, the first image may be a planar image. In some embodiments, the first image may be one of a stereoscopic image pair representing the same digital object. Accordingly, the associated display system may be a stereoscopic display system, as described above. In embodiments in which the display system is stereoscopic, the various operations in method 54 may be enacted separately for each of the right and left eyes 58 of user 12.

Figure 7:
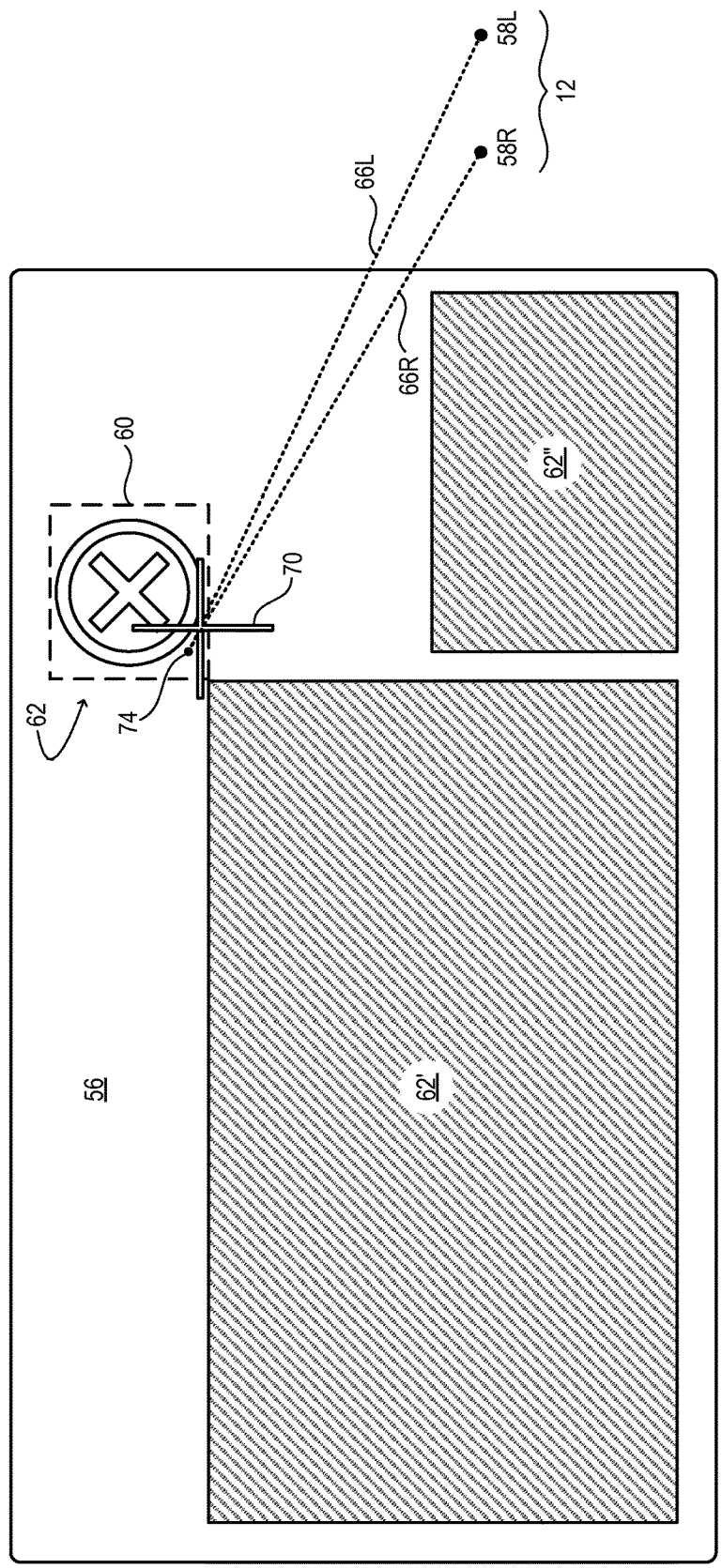
FIGS. 7 and 8 show aspects of an example user interface.

Digital object 62 may embody virtually any type of data structure. The digital object may be a photo, a video, a spreadsheet, a slide deck, a document, an audio track, or an application object, for example. In other examples, the digital object may be a user-interface control element, such as a button or slider. The window-closure button shown in FIG. 7 is one example of a digital object in the form of a user-interface control element. In general, the digital object represented by first image 60 may be an object available for interaction—e.g., targeting, selection, and/or activation by user 12. This first image 60 may be part of a larger display scene that includes image representations of other virtual display objects—e.g., objects 62' and 62" in FIG. 7.

In method 54, the various image representations may be anchored in different ways to the environment observed by user 12. In one implementation, first image 60 may occupy a position fixedly defined with reference to the user's field of view. The image may appear directly in front of the user, thirty degrees to the left of the user along the horizontal, etc. In another implementation, the first image may occupy a position defined with reference to a global coordinate system—GPS coordinates, for example. In these and other implementations, first image 60 may be rendered on the front (i.e., user-facing) surface of another virtual display object anchored in the global coordinate system.

Interconversion between the global coordinate system and coordinate systems local to display system 10 is accomplished with the aid of sensory componentry of the display system. Head-mounted display device 10A, for example, may include an inertial measurement unit (IMU) comprising one or more accelerometers, gyroscopes, and magnetometers. Output from the IMU enables the display-device controller to periodically update its location and orientation within the global coordinate system, so that appropriate coordinate transforms between global and local coordinate systems may be computed. In non-wearable implementations, a vision-system operatively coupled to the display may be configured to image the user and furnish output responsive to changing user location or orientation.

Continuing in FIG. 6, at 64 of method 54 a gaze axis 66 of user 12 is recognized based on output from appropriate gaze-tracking componentry. In some embodiments, a different gaze axis may be recognized for each of the user's eyes. Alternatively, a single, composite gaze axis may be recognized based on gaze from both eyes. In embodiments in which first image 60 is a plane image, the gaze axis may be approximately normal to the image plane of the first image.

In some embodiments, the act of recognizing a gaze 66 axis may include estimating coordinates—e.g., global or local coordinates of the gaze axis based on signal from a camera configured to image the user's eye. In other embodiments, recognizing the gaze axis may include estimating coordinates of the gaze axis based on signal from a non-imaging gaze-tracking sensor, such as an electrooculographical sensor. In other embodiments, recognizing the gaze axis may include estimating coordinates of the gaze axis based on skeletal tracking of the user. Such skeletal tracking may employ, as noted above, a depth-sensing or flat-image camera system directed toward the user. The skeletal-tracking approach may be useful in embodiments in which the display is a stationary display.

In some embodiments, recognizing the gaze axis may include the act of relating local coordinates of the gaze axis (viz., local to display system 10) to global coordinates. A head-mounted IMU (vide supra) may be used for this purpose as well. In some embodiments, a recognized gaze axis may extend no farther than the user's focal point—i.e., the intersection of right and left gaze axes. This feature enables discrimination among a plurality of concurrently presented digital objects based on depth of the display images representing those objects.

At optional step 68 of method 54, a cursor may be rendered on the display at coordinates where a gaze axis intersects the display plane—e.g., the physical plane of a display screen, or a focal plane used to display 3D, virtual imagery. The cursor may provide visual feedback to the user defining the direction being gazed at, but not necessarily the specific object being targeted, as some objects may appear behind or in front of the display screen or focal plane. The cursor may include a conspicuous graphic such as an arrow, or crosshairs 70 of FIG. 7, or a glowing cluster of pixels, for example.

Figure 8:
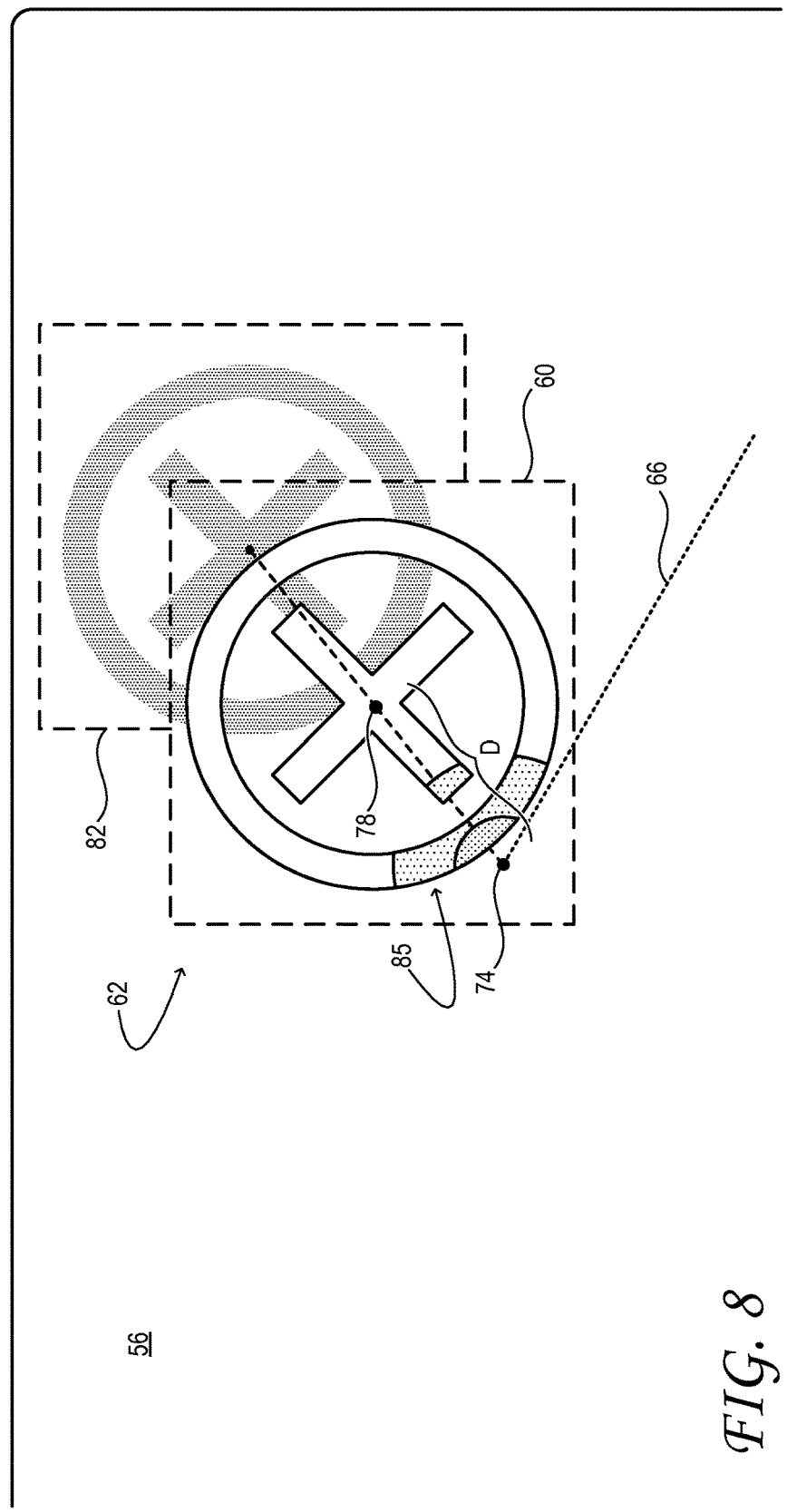

In the scenario represented in FIG. 7, user-gaze axes 66R and 66L intersect first image 60 of digital object 62. In a scenario such as this, the display system may provide additional feedback to user 12. The additional feedback may indicate that the UI element is available for interaction at the gaze location, is being interacted with, is being selected or activated, etc. In one implementation, as represented in FIG. 8, the feedback may include a parallax background effect resulting from concurrent display of a second, background image. In some implementations, the second image may appear only when the first image is intersected by a user-gaze axis. In other implementations, the second image may appear when a user-gaze axis is within a threshold distance from the first image. Accordingly, at 72 of method 54, a point of intersection of the user gaze axis through the first image is computed as target point 74. In alternative scenario, the computed target point may be the intersection of the gaze axis through the forward surface of any real object in the environment—e.g., a car, a building, or a wall of a building. This variant may be useful in cases where a digital object is to be represented within a real object.

Continuing in FIG. 6, and with collateral reference now to FIG. 8, at 76 of method 54, an offset distance D between the target point 74 and a reference position 78 of first image 60 is recognized. The reference position may be a center or edge of the first image, for example. Then, at 80, a second image 82 is presented on the display, displaced from the target point by an amount dependent on the offset distance. In FIG. 8, the second image is displaced from the first image by the offset distance D. Moreover, the direction of the displacement is away from the target point, along the line connecting the target point and the reference position. The geometry illustrated in FIG. 8 is one of several possible geometries that give the user a sense that the second image is projected or shadowed away from the target point, as though the target point were a source of illumination. In other words, second image 82 may be a shadowing image or facsimile of first image 60. The shadowing image may be displayed behind a plane passing through the first image, and shifted away from the point of intersection in a direction parallel to the plane. In some embodiments, the shadowing image may be a darker, diffuse, or blurred facsimile of the first image. More generally, the second image may be a re-colored facsimile of the first image. In these and other embodiments, the second image may be an incrementally rotated form of the first image.

The simulated projection of second image 82 has the effect of making a substantially planar image representation of digital object 62 appear more dimensional and conspicuous when receiving user gaze. Moreover, it provides a dynamic effect in that the projection changes as the user shifts his gaze (and therefore the target point) across first image 60 in any direction. Despite these advantages, alternative and/or additional effects may be used to reveal to the user a location of the target point relative to first image 60, via presentation of second image 82. Such effects more generally may include adding to, rotating, re-coloring, or distorting the first image in a manner that depends on offset distance D.

Method 54 may be extended in numerous ways to achieve additional advantages. For example, the overall presentation of a digital object 62 may be modified depending on the target point of the user's gaze. At 84 of method 54, accordingly, the first image is modified to include highlighting the first image at the point of intersection. For example, the button presentation of FIG. 8 may include a glow highlight 85 rendered at the intersection point of the gaze axis on first image 60. This effect gives the appearance that the target point is casting light onto the element. In effect, the shifting background provided behind the first image identifies the associated digital object as being selectable to the user; the changing offset of the shifting background gives the user an additional indication of his or her gaze position relative to the center of that element. The effects outlined above create visual interest and encourage the user to explore the various objects available on user interface 56.

Figure 9:
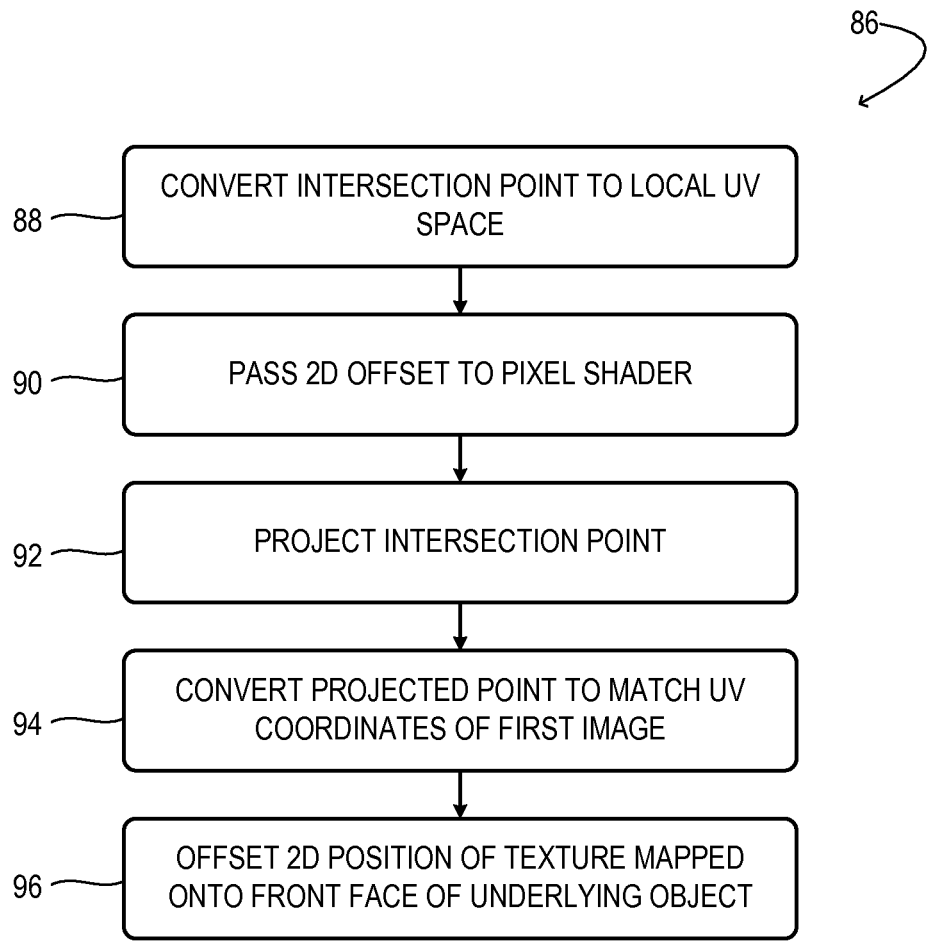
FIG. 9 illustrates another example method to provide visual feedback for gaze-based user-interface navigation.

An example mode of implementation of the above approach will now be described with reference to method 86 of FIG. 9. At 88 of method 86, the point of intersection of a user gaze axis 66 on the plane of first image 60 is converted to local UV space. At 90, the 2D offset from the center of the first image is passed to a pixel shader. A pixel shader is a functional engine of controller 18 that controllably darkens selected pixels of the virtual display imagery. At 92, the point of intersection is projected from the image plane onto an XY plane that will contain the second image. At 94, the coordinates of the projected point are converted such that the projected position matches the UV coordinates of each pixel of the first image. At 96, the pixel shader is used to offset the 2D position of the texture that is mapped onto front face of the underlying virtual display object. In this manner, the image texture will be offset in the direction of the projected gaze point from the center of the image plane, reflected across the center of the image plane.

Figure 5:
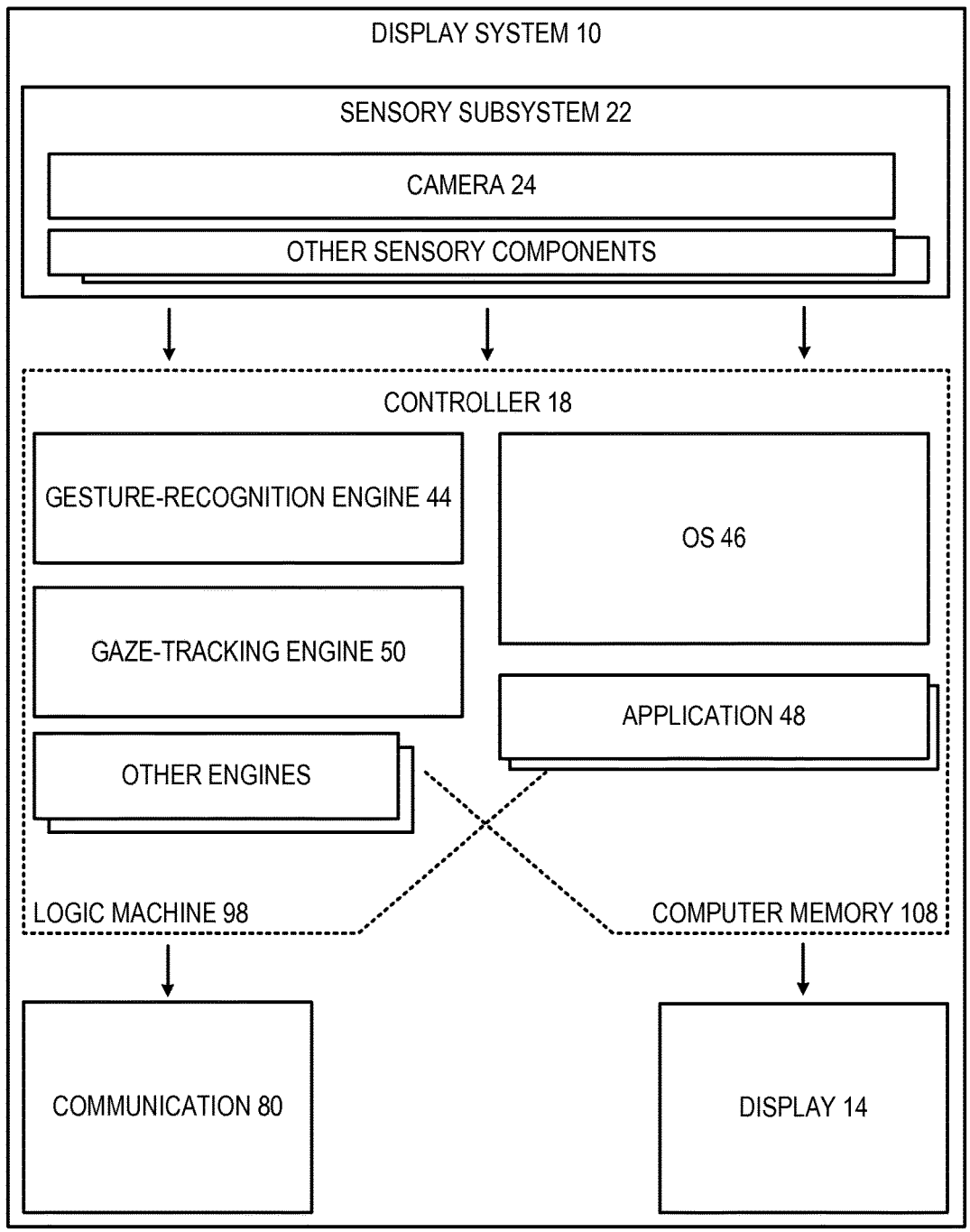
FIG. 5 schematically shows aspects of an example display system.

As evident from the foregoing description, the methods and processes described herein may be tied to a computer system of one or more computing machines. Such methods and processes may be implemented as a computer-application program or service, an application-programming interface (API), a library, and/or other computer-program product. FIG. 5 shows a non-limiting example of a computer system in the form of controller 18, which supports the methods and processes described herein. The computer system includes a logic machine 98 and associated computer memory 108.

Logic machine 98 includes one or more physical logic devices configured to execute instructions. A logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 98 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Computer memory 108 includes one or more physical, computer-memory devices configured to hold instructions executable by the associated logic machine 98 to implement the methods and processes described herein. When such methods and processes are implemented, the state of the computer memory may be transformed—e.g., to hold different data. Computer memory may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Computer memory may include volatile, nonvolatile, dynamic, static, read/write, read-only, random-access, sequential-access, location-addressable, file-addressable, and/or content-addressable devices.

It will be appreciated that computer memory 108 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 98 and computer memory 108 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term 'engine' may be used to describe an aspect of a computer system implemented to perform a particular function. In some cases, an engine may be instantiated via a logic machine executing instructions held in computer memory. It will be understood that different engines may be instantiated from the same application, service, code block, object, library, routine, API, function, etc. Likewise, the same engine may be instantiated by different applications, services, code blocks, objects, routines, APIs, functions, etc. The term 'engine' may encompass individual or groups of executable files, data files, libraries, drivers, scripts, database records, etc.

Communication system 102 may be configured to communicatively couple the computer system to one or more other machines. The communication system may include wired and/or wireless communication devices compatible with one or more different communication protocols. As non-limiting examples, a communication system may be configured for communication via a wireless telephone network, or a wired or wireless local- or wide-area network. In some embodiments, a communication system may allow a computing machine to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

One aspect of this disclosure is directed to a method to provide visual feedback for gazed-based user-interface navigation. The method comprises acts of: presenting on a display a first image representing a digital object available for user interaction; recognizing a user gaze axis; computing a point of intersection of the user gaze axis through the first image; recognizing an offset distance between the point of intersection and a reference position of the first image; and presenting a second image on the display displaced from the point of intersection by an amount dependent on the offset distance.

In some implementations, the above method may further comprise the act of estimating coordinates of the gaze axis based on signal from a camera configured to image an eye of the user, or based on signal from a non-imaging gaze-tracking sensor, or based on skeletal tracking of the user. In this implementation, the skeletal tracking may employ a camera system directed toward the user, and the display may be a stationary display. In some implementations, the above method may further comprise the act of estimating coordinates of the gaze axis based on signal from an inertial measurement sensor worn by the user. In these and other implementations, the gaze axis may extend no farther than a focal point of the user. In these and other implementations, the first image may be a forward image from among a plurality of images representing the digital object. In some implementations, the second image is a shadowing image of the first image, the shadowing image appearing behind a plane passing through the first image and shifted away from the point of intersection in a direction parallel to the plane. Here, the shadowing image may be a darker facsimile of the first image. In some implementations, the above method may further comprise the act of highlighting the first image at the point of intersection. In these and other implementations, the second image may be a re-colored facsimile of the first image, and/or a rotated form of the first image, and/or one of a stereoscopic image pair. In some implementations, the digital object may be a user-interface control element.

Another aspect of this disclosure is directed to a wearable computer device comprising: a near-eye display configured to present virtual imagery to a wearer; a camera configured to image an eye of the wearer; and, operatively coupled to the display and to the camera, a controller having a processor and associated computer memory, the memory storing instructions that cause the processor to: present on the display a first image representing a digital object available for interaction by the wearer, receive sensory signal from the camera, the sensory signal indicating a gaze axis of the wearer, compute a point of intersection of the gaze axis through the first image, and present a second image on the display away from the point of intersection, the second image revealing a location of the point of intersection relative to the first image. In one implementation, the display may be a stereoscopic display, and said acts of presenting, receiving, and computing are enacted separately for each eye of the wearer.

Another aspect of this disclosure is directed to a method to provide visual feedback for gazed-based user-interface navigation. The method comprises acts of: presenting on a display a first image representing a digital object available for interaction by a user; recognizing a gaze axis of the user; computing a point of intersection of the gaze axis through the first image; and presenting a second image on the display, away from the point of intersection, the second image including a shadowing image of the first image, the shadowing image appearing behind a plane passing through the first image and shifted away from the point of intersection in a direction parallel to the plane.

In some implementations, the first image may be a planar image, and the gaze axis may be substantially normal to the plane. In these and other implementations, the method may further comprise the act of highlighting the first image at the point of intersection.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to provide visual feedback for gaze-based user-interface navigation, the method comprising:
   presenting on a display a first image representing a digital object available for user interaction;
   recognizing a user gaze axis;
   computing a point of intersection of the user gaze axis through the first image;
   recognizing an offset distance between the point of intersection and a reference position within the first image; and
   presenting on the display, together with the first image, a like second image shifted away from the first image along a line connecting the point of intersection and the reference position, wherein the second image and the point of intersection are located on opposite sides of the first image, and wherein the second image is shifted by an amount dependent on the offset distance.

2. The method of claim 1, further comprising estimating coordinates of the gaze axis based on signal from a camera configured to image an eye of the user.

3. The method of claim 1, further comprising estimating coordinates of the gaze axis based on signal from a non-imaging gaze-tracking sensor.

4. The method of claim 1, further comprising estimating coordinates of the gaze axis based on skeletal tracking of the user.

5. The method of claim 4, wherein the skeletal tracking employs a camera system directed toward the user, and wherein the display is a stationary display.

6. The method of claim 1, further comprising estimating coordinates of the gaze axis based on signal from an inertial measurement sensor worn by the user.

7. The method of claim 1, wherein the gaze axis extends from an eye of the user to a focal point of the user, the focal point being defined as an intersection of right and left gaze axes computed, respectively, for right and left eyes of the user.

8. The method of claim 1, wherein the first image is a forward image from among a plurality of images representing the digital object.

9. The method of claim 1, wherein the second image is a shadowing image of the first image, the shadowing image appearing behind a plane passing through the first image and shifted away from the point of intersection in a direction parallel to the plane.

10. The method of claim 9, wherein the shadowing image is a darker facsimile of the first image.

11. The method of claim 1, further comprising highlighting the first image at the point of intersection.

12. The method of claim 1, wherein the second image is a re-colored facsimile of the first image.

13. The method of claim 1, wherein the second image is a rotated form of the first image.

14. The method of claim 1, wherein the first image is one of a stereoscopic image pair.

15. The method of claim 1, wherein the digital object is a user-interface control element.

16. A wearable computer device comprising:
   a near-eye display configured to present virtual imagery to a wearer;
   a camera configured to image an eye of the wearer; and
   operatively coupled to the display and to the camera, a controller having a processor and associated computer memory, the memory storing instructions that cause the processor to:
      present on the display a first image representing a digital object available for interaction by the wearer,
      receive sensory signal from the camera, the sensory signal indicating a gaze axis of the wearer,
      compute a point of intersection of the gaze axis through the first image,
      recognize an offset distance between the point of intersection and a reference position within the first image, and
      present on the display, together with the first image, a like second image shifted away from the first image along a line connecting the point of intersection and the reference position, wherein the second image and the point of intersection are located on opposite sides of the first image, and wherein the second image is shifted by an amount dependent on the offset distance.

17. The device of claim 16, wherein the display is a stereoscopic display, and wherein said acts of presenting, receiving, and computing are enacted separately for each eye of the wearer.

18. A method to provide visual feedback for gazed-based user-interface navigation, the method comprising:
   presenting on a display a first image representing a digital object available for interaction by a user;
   recognizing a gaze axis of the user;
   computing a point of intersection of the gaze axis through the first image; and
   presenting on the display, together with the first image, a like second image shifted away from the first image, wherein the second image and the point of intersection are located on opposite sides of the first image, and wherein the second image comprises a shadow image corresponding to the first image, the shadow image appearing behind a plane passing through the first image.

19. The method of claim 18, wherein the first image is a planar image, and wherein the gaze axis is substantially normal to the plane.

20. The method of claim 18, further comprising highlighting the first image at the point of intersection.

* * * * *